United States Patent
Sakai

[11] 4,018,512
[45] Apr. 19, 1977

[54] RETROFOCUS TYPE LENS

[75] Inventor: Yutaka Sakai, Omiya, Japan

[73] Assignee: Fuji Photo Optical Co., Ltd., Omiya, Japan

[22] Filed: Oct. 24, 1975

[21] Appl. No.: 625,778

Related U.S. Application Data

[63] Continuation-in-part of Ser. No. 515,221, Oct. 16, 1974, abandoned.

[30] Foreign Application Priority Data

Nov. 9, 1973    Japan ............................. 48-126655

[52] U.S. Cl. ................................................. 350/215
[51] Int. Cl.² ........................................... G02B 13/04
[58] Field of Search ............................. 350/215, 214

[56] References Cited
UNITED STATES PATENTS

| | | | |
|---|---|---|---|
| 3,731,989 | 5/1973 | Skimizu | 350/216 |
| 3,748,021 | 7/1973 | Tajima et al. | 350/214 |

*Primary Examiner*—John K. Corbin
*Assistant Examiner*—Conrad Clark

[57] ABSTRACT

A negative meniscus lens, a biconvex lens, a cemented biconcave lens, a cemented positive meniscus lens, a positive meniscus lens, and a positive lens arranged from the front to rear in this order constitute a retrofocus lens having a large diameter and short length with reduced aberrations. The air separation between the first lens and the second lens is designed to be longer than 0.45f and shorter than 0.75f to make the overall length of the lens system small without extremely increasing the refractive power of the first lens. The ratio of the radius of curvature of the front face of the second lens to that of the rear face thereof is designed to be greater than 0.33 and less than 0.6 to compensate for the spherical aberration and coma due to the first lens. The cemented face of the cemented biconcave lens located behind the second lens is designed to be convex to the rear.

1 Claim, 12 Drawing Figures

FIG. I
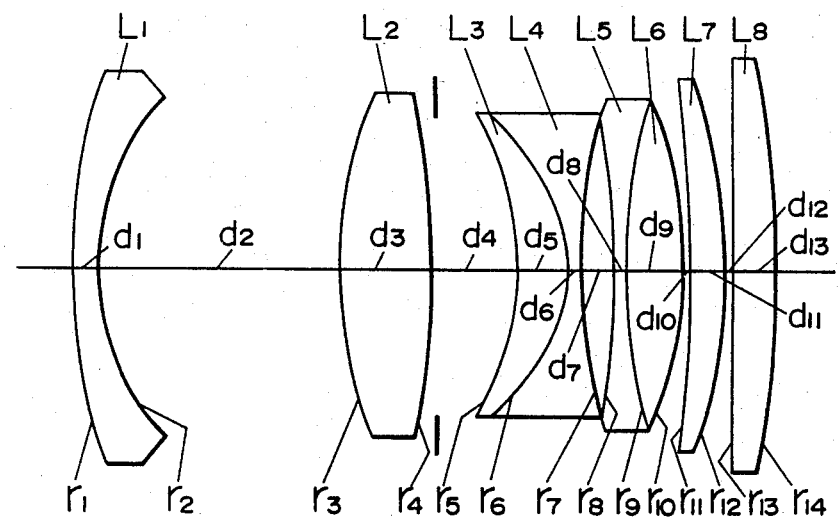
FIG.2A
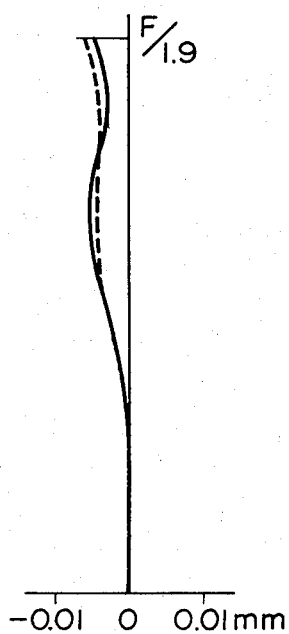
FIG.2B
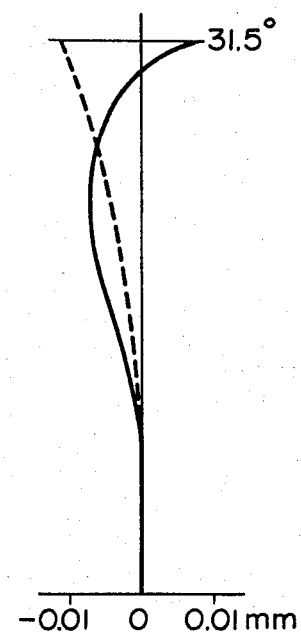
FIG.2C
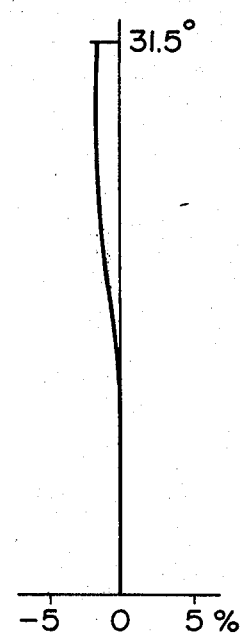

FIG.3
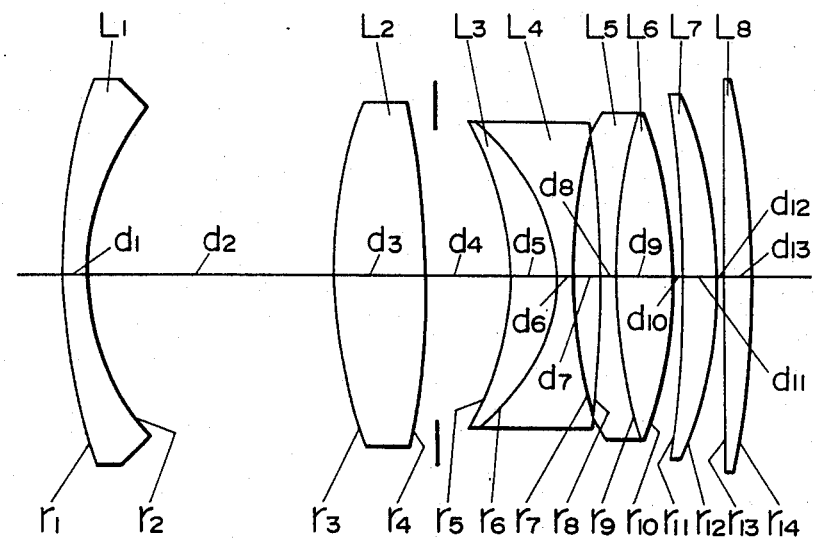
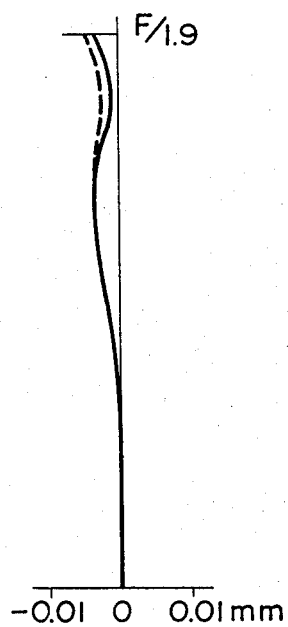
FIG.4A
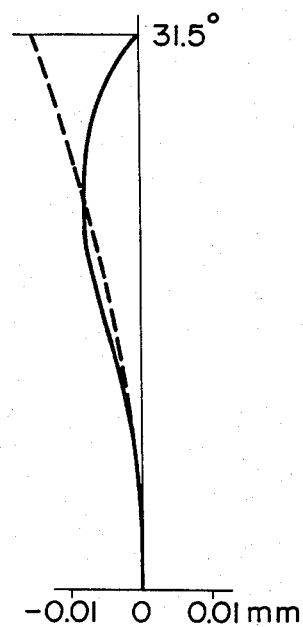
FIG.4B
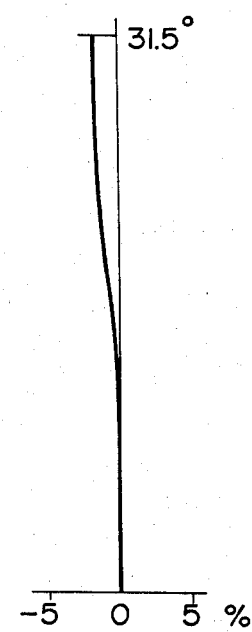
FIG.4C

RETROFOCUS TYPE LENS

This application is a continuation-in-part of U.S. application Ser. No. 515,221 filed Oct. 16, 1974, now abandoned.

BACKGROUND OF THE INVENTION

1. Field of the Invention

This invention relates to a retrofocus type wide angle lens, and more particularly to a retrofocus type wide angle lens of extremely small size having a large aperture.

2. Description of the Prior Art

Generally, in the retrofocus type lens, the distance between the negative lens system in the front lens component and the positive lens system in the rear lens component must be made long in order to obtain a sufficiently long back focus. Consequently, the overall length of the retrofocus type lens is generally great and the effective aperture of the negative lens of the front lens component is large. In practical use, the large aperture of the front lens component and the great overall length of the lens are inconvenient and undesirable.

In order to make the size of the lens compact, the distance from the front lens component to the rear lens component must be made as small as possible by increasing the refractive power of the negative lens in the front lens component. The increase in the refractive power of the negative lens in the front lens component, however, increases the degree of the various aberrations, particularly in the spherical aberration and comatic aberration. It is difficult to compensate for these aberrations particularly when the aperture of the lens is large.

SUMMARY OF THE INVENTION

In the light of the foregoing observations and description, the primary object of the present invention is to provide a retrofocus type lens of large aperture which has a small overall size.

Another important object of the present invention is to provide a retrofocus type lens of extremely small size in which aberrations are sufficiently compensated.

The retrofocus type lens in accordance with the present invention is a wide angle large aperture lens of small size whose F-number, angle of view and back focal length are 1.9, 63° and 1.07f, respectively, where $f$ is the focal length of the lens system as a whole.

In greater detail, the retrofocus type lens in accordance with the present invention comprises a negative meniscus lens L1 with the convex face thereof faced to the object side, a biconvex lens L2 with the face of greater curvature thereof faced to the object side, a cemented biconcave lens L3 and L4 with the face of greater curvature thereof faced to the object side and the cemented face thereof being convex to the image side, a cemented positive meniscus lens L5 and L6 with the convex face thereof faced to the image side, a positive meniscus lens L7 with the convex face thereof faced to the image side, and a positive lens L8, wherein the conditions;

1) $0.45f < d2 < 0.75f$,

2) $0.33 < \frac{r3}{|r4|} < 0.6$,

3) $0.05 < N3-N4 < 0.13$ and

4) $-0.45f < r6 < 0.33f$ are satisfied, where $f$ is the focal length of the lens system as a whole, $d2$ is the air separation between the negative meniscus lens and the biconvex lens, $r3$ is the radius of curvature of the front face of the biconvex lens, $r4$ is the radius of curvature of the rear face of the biconvex lens, $N3$ is the refractive index of the front lens element of the cemented biconcave lens, $N4$ is the refractive index of the rear lens element of the cemented biconcave lens, and $r6$ is the radius of curvature of the cemented face of the cemented biconcave lens.

BRIEF DESCRIPTION OF THE DRAWING

FIG. 1 is a diagram of the lens system in accordance with an embodiment of the present invention, FIG. 2A is a graph representing the correction for spherical aberration and the deviation in the sine condition of the lens in accordance with the present invention, FIG. 2B is a graph representing the correction for astigmatism of the lens in accordance with the present invention, FIG. 2C is a graph representing the correction for distortion of the lens in accordance with the present invention, FIG. 3 is a diagram of the lens system in accordance with a second embodiment of the present invention, FIGS. 4A, 4B and 4C are graphs representing the corrections for spherical aberration and the deviation in the sine condition, astigmatism, and distortion, respectively, of the lens in accordance with the second embodiment of the present invention.

PREFERRED EMBODIMENT OF THE INVENTION

Figure 5:
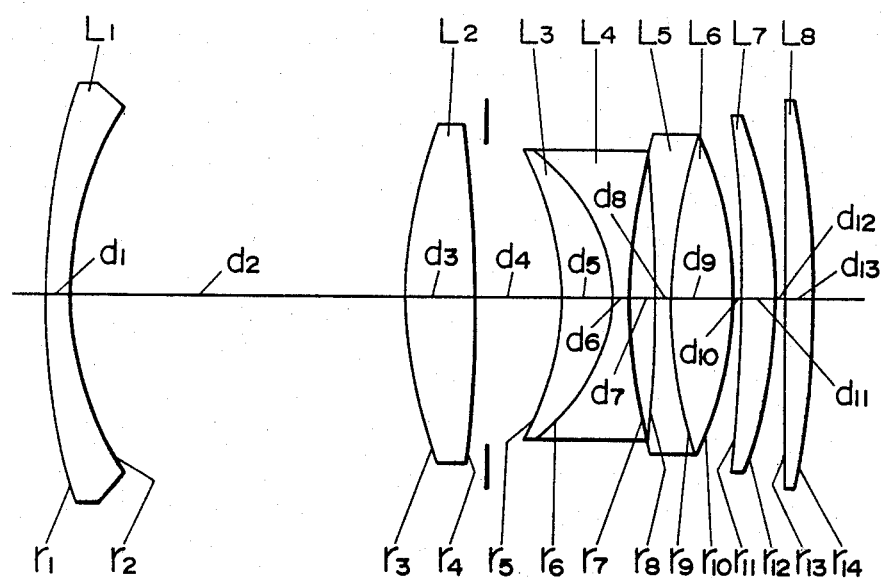
FIG. 5 is a diagram of the lens system in accordance with a third embodiment of the present invention.

Referring to FIG. 1 which shows the construction of the lens system of the retrofocus type lens in accordance with an embodiment of the invention, negative meniscus lens L1 and a convex lens L2 both of high refractive power are provided with small air separation therebetween. By properly selecting the shape of the convex lens L2, the spherical aberration due to the negative meniscus lens L1 and the comatic aberration with respect to the luminous flux passing through the lower half part of the stop are compensated for. Behind the convex lens L2 are provided four lens components of negative, positive, positive and positive power consisting of six lens elements L3 to L8 for obtaining a long back focal length. The negative lens component and the first positive lens component are cemented doublets consisting of a positive meniscus lens L3 and a biconcave lens L4, and a biconcave lens L5 and a biconvex lens L6, respectively. The cemented face of the cemented lens L3 and L4 is designed to increase the high-order spherical aberration so that the spherical aberration is reduced as a whole. Further, the comatic aberration with respect to the luminous flux passing through the upper half part of the stop is compensated for by the third lens L3 and the lenses located therebehind. Thus, the coma is reduced as a whole.

The first lens L1 is a negative meniscus lens the convex face r1 of which is faced to the object side. The second lens L2 is a biconvex lens the face of greater curvature r3 of which is faced to the object side. The third lens component L3 and L4 is a cemented biconcave doublet the face of greater curvature r5 of which is faced to the object side and the cemented face r6 of which is convex to the image side. The fourth lens component L5 and L6 is a cemented positive meniscus lens the convex face r10 of which is faced to the image side. The fifth lens L7 is a positive meniscus lens the convex face r12 of which is faced to the image side. The sixth lens L8 is a positive meniscus lens the convex face r14 of which is faced to the image side.

The retrofocus type lens in accordance with the present invention as described above is required to satisfy the following four conditions;

1. $0.45f < d2 < 0.75f$,

2) $0.33 < \dfrac{r3}{|r4|} < 0.6$,

3. $0.05 < N3-N4 < 0.13$ and

4. $-0.45f < r6 < -0.33f$, where $f$ is the focal length of the lens system as a whole, $d2$ is the air separation between the negative meniscus lens and the biconvex lens, $r3$ is the radius of curvature of the front face of the biconvex lens, $r4$ is the radius of curvature of the rear face of the biconvex lens, N3 is the refractive index of the front lens element of the cemented biconcave lens, N4 is the refractive index of the rear lens element of the cemented biconcave lens, and $r6$ is the radius of curvature of the cemented face of the cemented biconcave lens.

Now the above conditions will be explained in detail.
1. $0.45f < d2 < 0.75f$

These conditions are for making the lens system compact in size. If the air separation $d2$ exceeds the upper limit $0.75f$, the lens system cannot be made compact in size. On the other hand, if the air separation $d2$ becomes lower than the lower limit $0.45f$, the refractive power of the first lens L1 must be extremely increased in order to obtain the long back focal length. Increasing the refractive power of the first lens L1 makes the compensation for the aberrations of the lens system difficult. Accordingly, the air separation $d2$ between the first and the second lenses L1 and L2 is required to satisfy the above first conditions.

2) $0.33 < \dfrac{r3}{|r4|} < 0.6$,

These conditions are for compensation for the spherical aberration due to the negative meniscus lens L1 and for the comatic aberration due to the lens L1 with respect to the luminous flux passing through the lower half part of the stop. If the above defined value $$\dfrac{r3}{|r4|}$$

exceeds the upper limit 0.6, the spherical aberration due to the positive lens L2 increases. If the value becomes lower than the lower limit 0.33 the compensation for the coma becomes insufficient.

3. $0.05 < N3-N4 < 0.13$ and $-0.45f < r6 < -0.33f$

These conditions are for compensation for the spherical aberration due to the lens system as a whole. In accordance with these conditions, the cemented face increases the high-order spherical aberration in the direction of insufficient compensation and prevents excessive compensation for the spherical aberration with respect to the marginal rays by the system as a whole. The cemented face is convex to the image side so that the face does not affect the off-axis aberration.

In accordance with the above described conditions, it is possible to obtain a wide angle retrofocus type lens of extremely small size having considerably reduced aberrations and having an F-number of 1.9, an angle of view of 63° and a back focal length of $1.07f$.

Numerical data for the embodiment described hereinabove and shown in FIG. 1 are given in Table I, in which $r1, r2 \ldots$ represent the radii of curvature of the individual surfaces of the lenses, a positive sign indicating that the surface is convex to the front and a negative sign indicating that the surface is concave thereto, and $d1, d2 \ldots$ represent the axial thicknesses of the lenses or the axial air separations between the lenses of the system. Table I also gives the mean refractive indices $N1, N2 \ldots$ for the $d$-line of the spectrum and the Abbe numbers $\nu1, \nu2 \ldots$ of the glass used for the lenses.

The focal length $f$ of the retrofocus type lens as described above is 1.0, the back focal length $Bf$ of the lens is 1.0719 and the F-number F is 1.9.

The Seidel sums of the retrofocus type lens in accordance with the present invention are given in Table II, in which I represents the Seidel sum of spherical aberration, II represents the Seidel sum of coma, III represents the Seidel sum of astigmatism, IV represents the Petzual sum, and V represents the Seidel sum of distortion.

TABLE I

| | | |
|---|---|---|
| r1 1.19931 | d1 0.05 | N1 1.51633 $\nu1$ 64.0 |
| r2 0.53902 | d2 0.502 | |
| r3 0.94324 | d3 0.193 | N2 1.77252 $\nu2$ 49.6 |
| r4 −1.80218 | d4 0.18 | |
| r5 −0.62505 | d5 0.1 | N3 1.72 $\nu3$ 43.7 |
| r6 −0.37736 | d6 0.03 | N4 1.62606 $\nu4$ 39.1 |
| r7 1.10829 | d7 0.06 | |
| r8 −2.42094 | d8 0.03 | N5 1.69895 $\nu5$ 30.1 |
| r9 1.28205 | d9 0.12 | N6 1.6968 $\nu6$ 55.6 |
| r10 −0.83459 | d10 0.01 | |
| r11 −3.53215 | d11 0.08 | N7 1.6968 $\nu7$ 55.6 |
| r12 −1.01977 | d12 0.01 | |
| r13 −18.13010 | d13 0.08 | N8 1.6968 $\nu8$ 55.6 |

TABLE I-continued r14 −2.17492

TABLE II

| | | | | | |
|---|---|---|---|---|---|
| 1 | 0.13018 | 0.08701 | 0.05816 | 0.28392 | 0.22865 |
| 2 | −3.79270 | 0.24440 | −0.01575 | −0.63173 | 0.04172 |
| 3 | 2.81647 | 0.98798 | 0.34657 | 0.46206 | 0.28366 |
| 4 | 2.84401 | −1.47000 | 0.75981 | 0.24184 | −0.51773 |
| 5 | −7.36689 | 1.78736 | −0.43365 | −0.66971 | 0.26770 |
| 6 | 1.82663 | −0.04921 | 0.00133 | 0.08901 | −0.00243 |
| 7 | −0.97024 | −0.90027 | −0.83535 | −0.34740 | −1.09746 |
| 8 | 0.00024 | 0.00689 | 0.19514 | −0.16993 | 0.71373 |
| 9 | −0.00633 | −0.00458 | −0.00331 | −0.00058 | −0.00281 |
| 10 | 1.04114 | −0.27315 | 0.07167 | 0.49204 | −0.14790 |
| 11 | −0.04432 | 0.06917 | −0.10797 | −0.11629 | 0.35000 |
| 12 | 2.54648 | −0.28873 | 0.03274 | 0.40269 | −0.04937 |
| 13 | −0.29930 | 0.23796 | −0.18920 | −0.02265 | 0.16844 |
| 14 | 1.84064 | −0.34273 | 0.06382 | 0.18881 | −0.04704 |
| Σ | 0.56602 | 0.09210 | −0.05601 | 0.20212 | 0.18915 |

Numerical data for a second embodiment as shown in FIG. 3 are given in Table III. The focal length of the retrofocus type lens in accordance with this embodiment is 0.998, the back focal length of the lens is 1.072 and the F-number is 1.9.

The corrections for spherical aberration, astigmatism and distortion of this lens system are shown in FIGS. 4A, 4B and 4C, respectively.

TABLE III

| r1 1.24093 | | |
|---|---|---|
| | d1 0.050 | N1 1.5163 $\nu$1 64.0 |
| r2 0.55341 | | |
| | d2 0.509 | |
| r3 0.95487 | | |
| | d3 0.193 | N2 1.7883 $\nu$2 47.4 |
| r4 −1.89690 | | |
| | d4 0.180 | |
| r5 −0.60451 | | |
| | d5 0.100 | N3 1.7234 $\nu$3 38.0 |
| r6 −0.37761 | | |
| | d6 0.028 | N4 1.6129 $\nu$4 37.0 |
| r7 1.08344 | | |
| | d7 0.060 | |
| r8 −2.65747 | | |
| | d8 0.028 | N5 1.6990 $\nu$5 30.1 |
| r9 1.26887 | | |
| | d9 0.124 | N6 1.6968 $\nu$6 55.6 |
| r10 −0.85620 | | |
| | d10 0.010 | |
| r11 −3.54327 | | |
| | d11 0.080 | N7 1.6204 $\nu$7 60.3 |
| r12 0.96141 | | |
| | d12 0.010 | |
| r13 187.79343 | | |
| | d13 0.060 | N8 1.6204 $\nu$8 60.3 |
| r14 −2.11797 | | |

Numerical data for a third embodiment as shown in FIG. 5 are given in Table IV. The focal length of the retrofocus type lens in accordance with this embodiment is 1.0, the back focal length of the lens is 1.070 and the F-number is 1.9.

Figure 6A:
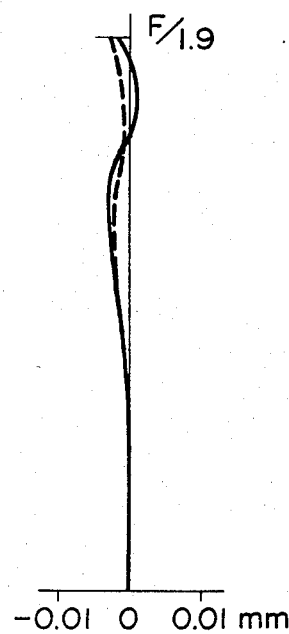
FIGS. 6A, 6B and 6C are graphs representing the corrections for spherical aberration and the deviation in the sine condition, astigmatism and distortion, respectively, of the lens in accordance with the third embodiment of the present invention.
Figure 6B:
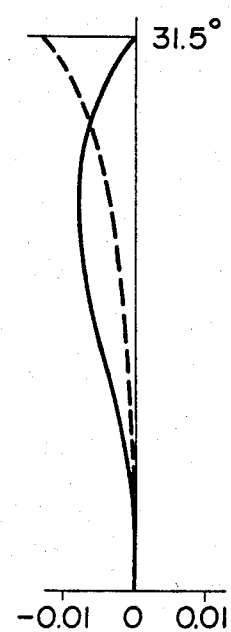
Figure 6C:
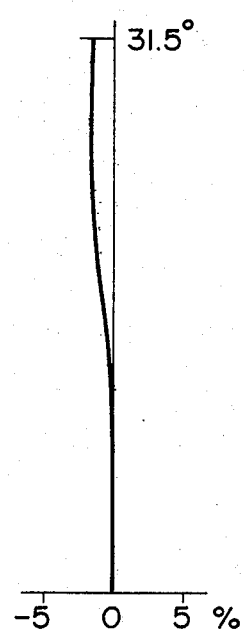

The corrections for spherical aberration, astigmatism and distortion of this lens system are shown in FIGS. 6A, 6B and 6C, respectively.

TABLE IV

| r1 1.56372 | | |
|---|---|---|
| | d1 0.05 | N1 1.5163 $\nu$1 64.0 |
| r2 0.70947 | | |
| | d2 0.70 | |
| r3 0.90123 | | |
| | d3 0.15 | N2 1.7883 $\nu$2 47.4 |
| r4 −2.34687 | | |
| | d4 0.18 | |
| r5 −0.60074 | | |
| | d5 0.11 | N3 1.7234 $\nu$3 38.0 |
| r6 −0.34965 | | |
| | d6 0.03 | N4 1.6513 $\nu$4 38.3 |
| r7 1.11123 | | |
| | d7 0.06 | |
| r8 −2.76778 | | |
| | d8 0.03 | N5 1.6990 $\nu$5 30.1 |
| r9 1.03189 | | |
| | d9 0.13 | N6 1.6968 $\nu$6 55.6 |
| r10 −0.82624 | | |
| | d10 0.01 | |
| r11 −3.08452 | | |
| | d11 0.08 | N7 1.6204 $\nu$7 60.3 |
| r12 −1.01389 | | |
| | d12 0.01 | |
| r13 ∞ | | |
| | d13 0.06 | N8 1.6204 $\nu$8 60.3 |
| r14 −1.89430 | | |

I claim:

1. A retrofocus type lens comprising a negative meniscus lens with a face convex to the object side, a biconvex lens located behind the negative meniscus lens with the surface of greater curvature thereof convex to the object side, a cemented biconcave lens located behind said biconvex lens with the surface of greater curvature thereof concave to the object side and the cemented face thereof convex to the image side, a cemented positive meniscus lens located behind said cemented biconcave lens with a surface thereof convex to the image side, a positive meniscus lens located behind said cemented positive meniscus lens with a face thereof convex to the image side, and a positive lens located behind said positive meniscus lens, wherein the conditions;

$$0.45f < d2 < 0.75f,$$

$$0.33 < \frac{r3}{|r4|} < 0.6$$

$$0.05 < N3-N4 < 0.13 \text{ and}$$

$$-0.45f < r6 < -0.33f$$

are satisfied, where $f$ is the focal length of the lens system as a whole, $d2$ is the air separation between the negative meniscus lens and the biconvex lens, $r3$ is the radius of curvature of the front face of the biconvex lens, $r4$ is the radius of curvature of the rear face of the biconvex lens, N3 is the refractive index of the front lens element of the cemented biconcave lens, N4 is the refractive index of the rear lens element of the cemented biconcave lens, and $r6$ is the radius of curvature of the cemented face of the cemented biconcave lens.

* * * * *